United States Patent [19]

Berger et al.

[11] Patent Number: 4,749,300

[45] Date of Patent: Jun. 7, 1988

[54] MULTI-FUNCTIONAL RECIPROCATING SHAFT COUPLING APPARATUS

[75] Inventors: John M. Berger; Bruce R. Deeds, both of Muncie, Ind.

[73] Assignee: Maxon Corporation, Muncie, Ind.

[21] Appl. No.: 4,597

[22] Filed: Jan. 20, 1987

[51] Int. Cl.[4] ........ F16C 11/06

[52] U.S. Cl. ........ 403/77; 403/135

[58] Field of Search ........ 403/76, 77, 78, 165, 403/146, 132, 122, 300, 135

[56] References Cited

U.S. PATENT DOCUMENTS

| | | | |
|---|---|---|---|
| 1,516,891 | 11/1924 | Pridgen | 403/165 |
| 2,471,672 | 5/1949 | Booth | 403/132 |
| 2,497,183 | 2/1950 | Monroe | 403/78 X |
| 2,519,460 | 8/1950 | Hansen | 403/78 X |
| 2,537,629 | 1/1957 | Brown | 403/132 |
| 3,150,391 | 11/1964 | Carmi et al. | 403/76 |
| 3,343,857 | 9/1967 | Cislo | 403/132 |
| 3,406,992 | 10/1968 | Grotness | 403/77 X |
| 4,106,170 | 8/1978 | Schueneweis | 403/176 X |
| 4,511,276 | 4/1965 | Doutt | 403/77 |

*Primary Examiner*—Dave W. Arola
*Attorney, Agent, or Firm*—Robert Ward

[57] ABSTRACT

The present invention concerns an improvement in force directing apparatus for transmitting force in respective longitudinal directions from a first shaft to a second shaft where the longitudinal axis of such shafts may be misaligned. The shaft coupling apparatus hereof comprises a compound collar means, and a compound force-directing washer means disposed within the collar means. The collar means preferably comprises two portions which are threadably secured to each other, and which contain a central bore portion therein. A compound force-transmitting washer means is disposed therein and includes washer means formed from the group consisting of materials which differ in chemical composition and materials which differ in hardness. Such compound force-transmitting washer means functions to minimize cold flow and self-adhesion which would otherwise over time and use bind the washer layers together.

31 Claims, 2 Drawing Sheets

MULTI-FUNCTIONAL RECIPROCATING SHAFT COUPLING APPARATUS

BACKGROUND OF THE INVENTION

The present invention is directed to force transmitting apparatus, and more particularly is directed to an apparatus for directing a pushing or pulling force from one shaft and transmitting such force to a second shaft, accurately and despite any misalignment between such shafts.

Prior art devices have rendered somewhat difficult the transmission of force from one shaft to another shaft where there is misalignment therebetween. The problem has arisen frequently in valve applications wherein such misaligned shafts cause binding and inefficient and/or inaccurate operation of the valve. Substantial expenses in the design and redesign of such devices have resulted. Moreover, when force transmitting elements have been placed between the two such possibly misaligned shafts, the additional difficulties of cold flow and self-adhesion have occurred with regard to such force directing elements.

Accordingly, and in view of the above defects and deficiencies of the prior art, it is a material object of the improved multi-functional reciprocating shaft coupling apparatus of the present invention to materially alleviate such problems.

It is a yet further object of the improved multi-functional reciprocating shaft coupling apparatus of the present invention to permit the transmission of force between two possibly misaligned shafts, and to do so smoothly and efficiently, and without problems of cold flow and self-adhesion between force transmitting elements, as in the prior art.

The above and other objects of the present invention will be better understood with respect to the following description of the invention.

SUMMARY OF THE INVENTION

The present invention relates to a force transmitting apparatus for directing a pushing or pulling force in a longitudinal direction from a first shaft to a second shaft where there may be misalignment of the two shafts.

The improved multi-functional reciprocating shaft coupling apparatus of the present invention includes an elongated collar means having openings at the opposite ends for the disposition of the shafts therethrough, and having a washer-containing space in the central portion thereof.

Such washer containing space contains at least two substantially disc-shaped washer layers disposed in stacked array. The washer layers are selected from materials which either differ in chemical composition or differ in hardness, thereby to substantially reduce cold flow and/or self-adhesion between the washer layers, which would materially diminish the functioning thereof.

The present invention will be better understood with respect to the following brief description of the drawing, detailed description of preferred embodiments, the accompanying drawing, and the appended claims.

BRIEF DESCRIPTION OF THE DRAWING

The improved multi-functional shaft coupling apparatus of the present invention is depicted in the accompanying drawing, and in which.

DETAILED DESCRIPTION OF PREFERRED EMBODIMENTS

Figure 1:
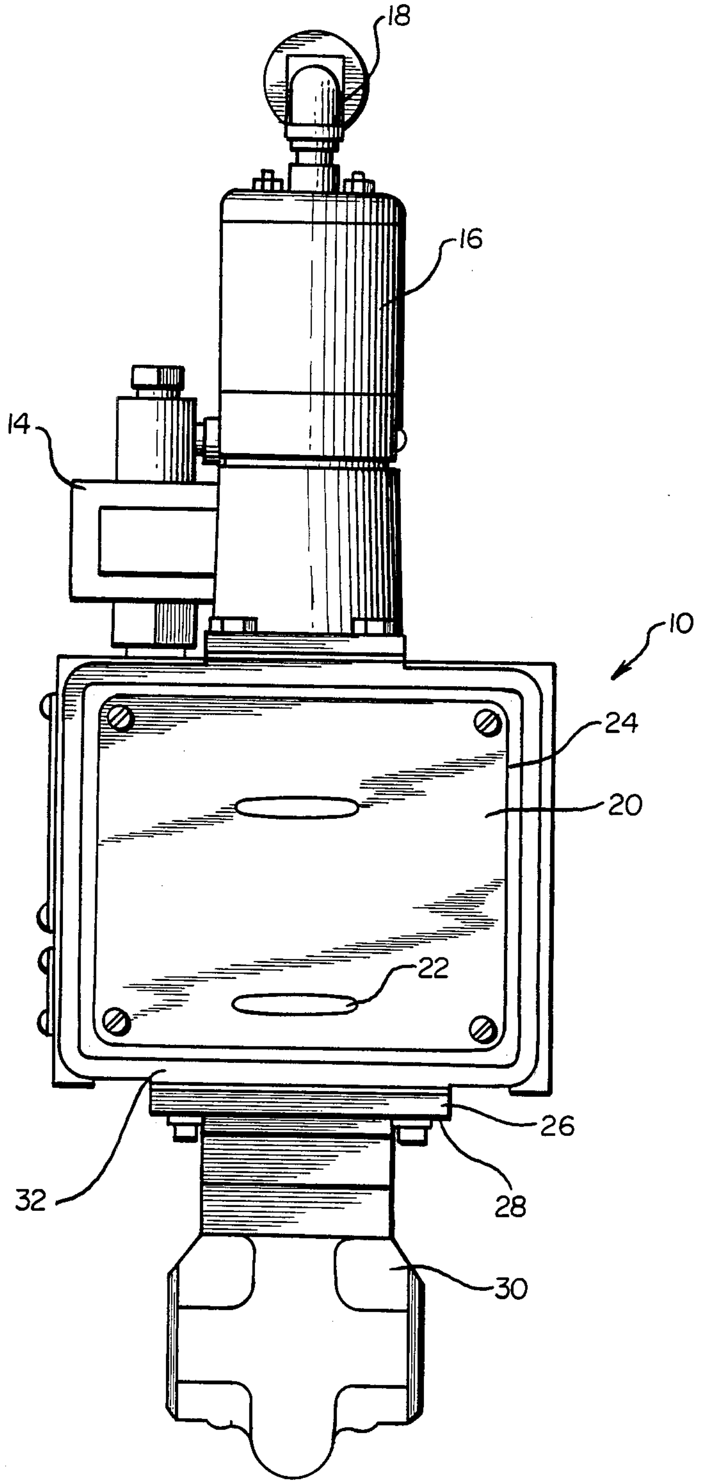
FIG. 1 is a front view of a valve assembly such as may utilize the application of the improved multi-functional reciprocating shaft coupling apparatus of the present invention and depicting a valve solenoid subassembly disposed at the top portion thereof, an information plate disposed on the side thereof, a main base adapter disposed beneath an observation plate on the main base of the assembly, and further depicting the vlve body assembly disposed at the bottom portion thereof.

The improved multi-functional reciprocating shaft coupling apparatus of the present invention is directed to a force transmitting apparatus for directing a pushing or pulling force in a longitudinal direction between a first shaft to a second shaft. The respective longitudinal axes of such shafts may be respectively misaligned.

The improved multi-functional reciprocating shaft coupling apparatus is further directed to an improvement comprising a substantially elongated collar means having a longitudinally disposed central bore therethrough, and having aperture means at both longitudinal ends of such collar means. The aperatures at opposite ends thereof function to accommodate the first and second shafts (i.e., the pushing/pulling and the pushed/-pulled shafts) for transmittal of a pushing/pulling force from the first shaft to the second shaft. The central bore in the elongated collar means further includes therein a washer containing space.

Such elongated collar means comprises preferably a top and a lower collar element, which elements are joined together preferably by threaded means, respectively disposed on the top and lower collar elements. One of the collar elements has interior threads disposed in the central bore portion thereof for joining with exteriorly disposed threads of the other collar element. In such preferred embodiments of the present invention, one or more set screws are further disposed in one of such collar elements for preventing disassembly of the collar means. Such set screws are preferably disposed through a lateral side wall of one of such collar elements and engage the exterior threads of the other collar element to securely hold said collar means together. Of course, other means of securing the collar elements in such functional relationship are considered to be functional equivalents to the means described, and as such are considered to be within the scope of the present invention.

An annular-shaped insert means may also preferably be disposed around the first shaft, and fixedly secured thereto means of one or more set screws.

The second element of the improved multi-functional reciprocating shaft coupling apparatus of the present invention is directed to compound force transmitting washer means. Such force transmitting washer means includes at least two substantially disc-shaped washer layers disposed in stacked array. The washer means is formed from solid, substantially hard materials. Such materials may either be different in chemical composition, or different in hardness. In either instance, the function and result thereof is to minimize cold flow and self-adhesion between such stacked layers of the force transmitting washer means of the present invention, and as such to reduce materially any cold flow and/or self-adhesion which would bind the washer layers together and substantially diminish the effectiveness of such washer means.

As to composition, in some preferred embodiments the disc-shaped washer layers of the compound force transmitting washer means may comprise respective layers of but not restricted to metal and polytetrafluoroethylene resins (hereinafter designated as "Telfon", a registered trademark of E. I. duPont deNemours Co., Wilmington, Del.), and/or a metallized Teflon. Such metallized Teflon may preferably be molybdenum-filled Teflon. Other modified Teflons include fiberglas-filled and graphite-filled Teflon. In shape, such force transmitting washer means may comprise disc-shaped washers, or spherical washers. In such preferred embodiments, the washer layers may be preferably disposed in substantially laterally slipable array, and within the washer containing space of the substantially elongated collar means.

Figure 2:
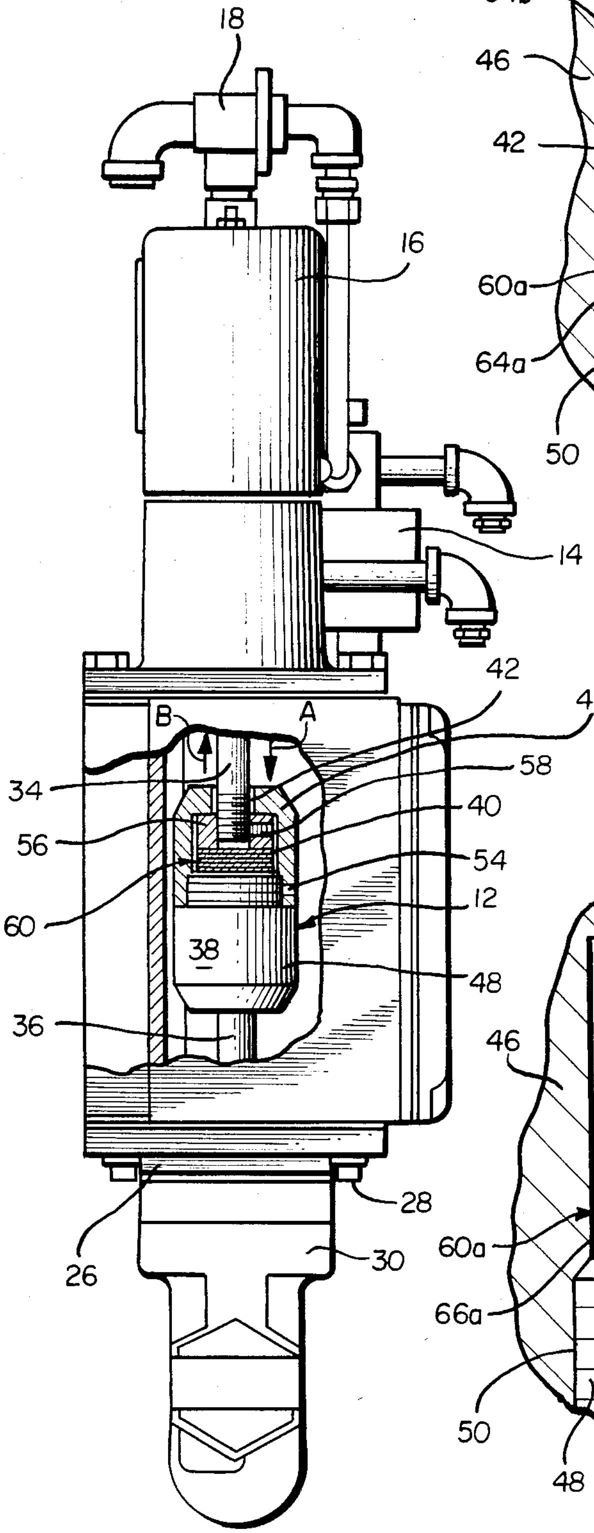
FIG. 2 is a right side view of the valve structure of FIG. 1, with the main body sub-assembly side partially sectioned away, and showing the improved multi-functional reciprocating shaft coupling apparatus of the present invention disposed in the interior of such main base sub-assembly and in partial cross-section.

Referring now to the drawing, and to FIGS. 1 and 2 in particular, FIG. 1 shows a front view of a valve assembly generally 10 such as may utilize the application of the improved multi-functional reciprocating shaft coupling apparatus of the present invention generally 12 as shown most completely in FIG. 2. Such valve assembly 10 includes a valve solenoid sub-assembly 14 disposed at the top portion 16 thereof and adjacent the exhaust valve sub-assembly 18 of valve assembly 10. Information plate 20 is disposed on the left side thereof and may include trademark, model number, instructions or other information. The observation glass 21 may preferably include observation ports 22, 24 for visually determining respectively whether the valve is open or closed. Disposed beneath the observation glass 21 is the main base adapter 26 which preferably has a gasket 28 disposed therebeneath in sealing relationship with the valve body assembly 30 which is disposed at the bottom portion 32 thereof.

As shown in FIG. 2, the embodiment of the improved multi-functional reciprocating shaft coupling apparatus 12 of the present invention depicted therein is directed to a force transmitting apparatus for directing a pushing force in a longitudinal direction (Arrow A) and a pulling force in the opposite longitudinal direction (Arrow B), between a first shaft 34 to a second shaft 36. During manufacture or in use, the respective longitudinal axes of such shafts may be or have become somewhat misaligned with each other, which is a condition intended to be remedied by means of the present invention.

Improved multi-functional reciprocating shaft coupling apparatus 12 includes a substantially elongated collar means 38 having a longitudinally disposed central bore 40 therethrough, and having aperture means 42,42 at both longitudinal ends of such collar means 38. Such aperture means 42,42 at opposite ends thereof function to accommodate the first and second shafts 34,36 in respectively pushing/pulling and pushed/pulled relationship, for transmittal of a pushing/pulling force from first shaft 34 to the second shaft 36. The central bore 40 in the elongated collar means further includes therein respective washer containing pushing and pulling spaces 44,45.

Elongated collar means 38 comprises a top collar element 46 and a lower collar element 48, which elements are joined together preferably by threaded means 50,52 respectively disposed on the top and lower collar elements 46,48. One of th ecollar elements (here, top collar element 46) has interior threads disposed in the central bore 40 thereof for joining with exteriorly disposed threads on the other collar element (here, lower collar element 48). In preferred embodiments of the present invention, one or more set screws 54 are further disposed in top collar element 46 for preventing disassembly of collar means 38 and for securing the threaded second shaft 36 to collar means 38. Such one or more set screws 54 are disposed through a lateral side wall of top collar element 46 and engage the exterior threads 52 of lower collar element 48 to securely hold said collar means 38 together. Such set screws have nylon, Teflon, or other suitable tips, so that the exterior threads are not damaged.

An annular-shaped force transmission insert means 56 is disposed in connection to the first, or pushing shaft 34 by means of a threaded tip 57. Such threaded tip 57 is fixedly secured to the force transmission insert means 56 by means of one or more set screws 58, and/or other securement means well known to those skilled in the art.

Figure 3:
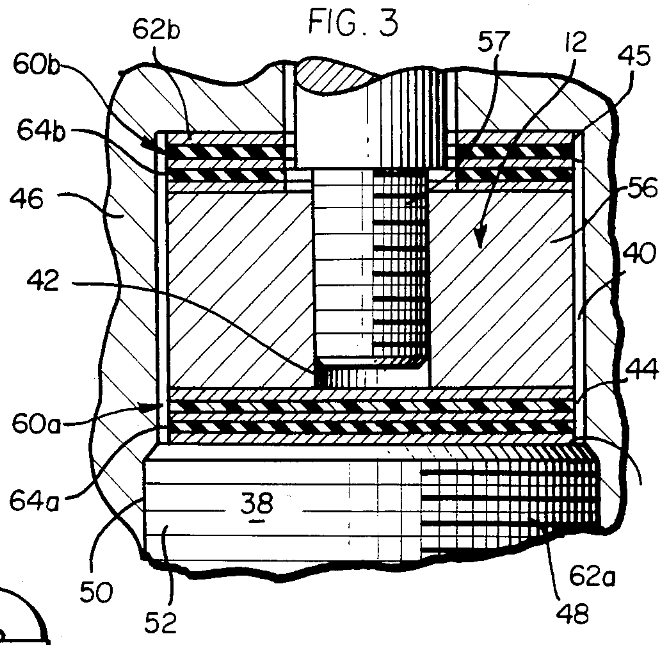
FIG. 3 is a greatly enlarged cross-sectional view of the improved multi-functional reciprocating shaft coupling apparatus of the present invention showing one preferred embodiment comprising several layers of force transmitting washers comprising disc of Telfon and a metallized Teflon material disposed for functioning in both pushing ad pulling transmission.
Figure 4:
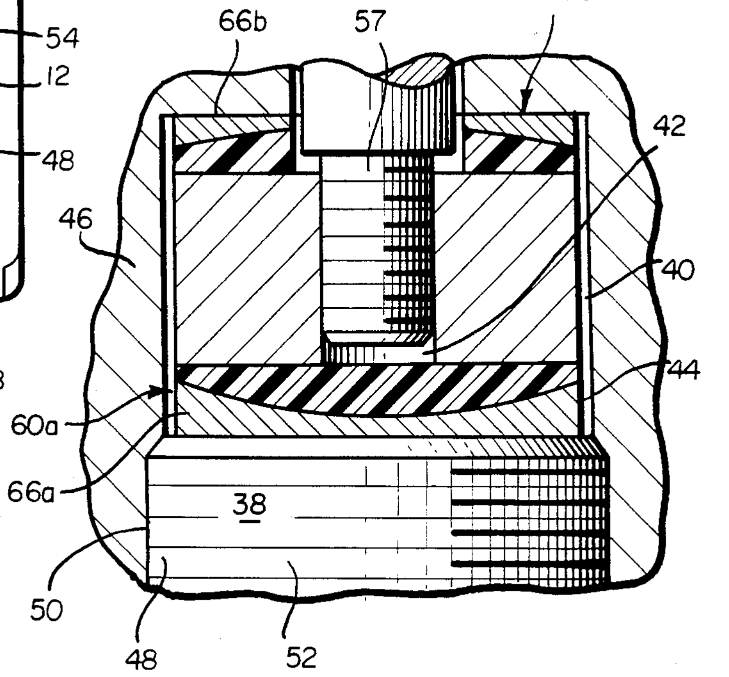
FIG. 4 is a greatly enlarged cross-sectional view of the improved multi-functional reciprocating shaft coupling apparatus of the present invention, and showing the force transmitting washer element in the form of an alternative embodiment comprising spherical washers, such washers being of either different chemical composition or different hardness, and disposed for both pushing and pulling functioning.

The second element of the improved multi-functional reciprocating shaft coupling apparatus 12 of the present invention is directed to a compound pushing force transmitting washer means generally 60*a*, and pulling force transmission washer means 60*b*, as shown in FIGS. 3 and 4. Such force transmitting washer means 60*a*,60*b* may include at least two substantially disc-shaped washer layers respectively 62*a*,62*b* disposed in stacked array, and as many as five or more such layers 62*a*,62*b*, as shown in FIGS. 2 and 3. Such washer means 60*a*,60*b* are formed from solid, substantially hard materials. Such materials may either be different in chemical composition, or different in hardness. In either instance, the function and result thereof is to minimize cold flow and self-adhesion between such stacked layers 62*a*,62*b* of the force transmitting washer means 60*a*,60*b* of the present invention, and as such diminish or eliminate any cold flow and/or self-adhesion which would bind the washer layers together and substantially reduce the effectiveness of such washer means.

In some preferred embodiments, the disc-shaped washer layers 62*a*,62*b* of the compound force transmitting washer means may comprise respective layers of metal and Teflon. Also, the compound force transmitting washer means may comprise layers of low surface friction materials such as but not restricted to Teflon and a metallized Teflon. Such metallized Teflon may preferably be molybdenum-filled or other modified Teflons. Such force transmitting washer means 60*a*,60*b* may comprise disc-shaped washers 64a,64b as shown in FIGS. 2 and 3, or mating spherical washers 66a,66b, as shown in FIG. 4. In such preferred embodiments, the washer layers 62a,62b may be preferably disposed in substantially laterally slipable array and within the washer containing space 44 of substantially elongated collar means 38, and disposed on opposite, top and bottom sides of force transmission insert means 56.

In preferred embodiments, such valve assembly 10 may be any of a wide variety of formats, styles and constructions, and for example may be of the rising stem or swinging gate variety, may be normally closed or normally open, may be manual or automatic, and may be general purpose or hazardous duty in construction. Presently contemplated sizes for most popular use include ¾" to 6" for rising stem valves, and ⅜" to 2" for swinging gate valves. Popular accessories for use in connection with valves utilizing the present invention might include switches, TD time delay units, terminal blocks, etc.

The improved multi-functional reciprocating shaft coupling apparatus 12 of the present invention has a wide variety of uses and applications. Such apparatus may be utilized as a switch actuator, an open/shut indicator, and a stroke limiting device, in addition to its primary function as a force transmitting apparatus for pushing/pulling between two possibly misaligned shafts.

The basic and novel characteristics of the readily understood from the foregoing disclosure by those skilled in the art. It will become readily apparent that various changes and modifications may be made in the construction and arrangement of the improved apparatus of the present invention as set forth hereinabove without departing from the spirit and scope of the invention. Accordingly, the preferred and alternative embodiments of the present invention set forth hereinabove are not intended to limited such spirit and scope in any way.

What is claimed is:

1. In a force transmitting apparatus for directing a force in a longitudinal direction from a first shaft to a second shaft, the respective longitudinal axes of which may be misaligned, the improvement comprising:
   a collar means having a longitudinally disposed central bore therethrough, including means for restricting lateral and longitudinal movement of the first and second shafts to facilitate transmittal of force therebetween, and having aperture means at both longitudinal ends thereof for accommodating the first and second shafts therein for transmittal of force from the first shaft to the second shaft, said central bore further including therein a washer containing space; and
   a compound force transmitting washer means disposed within said washer containing space, and having at least two washer layers disposed in stacked and substantially aligned array, said washer means formed from solid, substantially hard materials selected from the group consisting of materials which differ in chemical composition and materials which differ in hardness, thereby to minimize cold flow and self-adhesion as a result of such force transmitting between the first shaft and the second shaft, which would bind said washer layers together and substantially diminish the effectiveness of such washer means.

2. The improvement of claim 1 wherein said washer layers of said compound force transmitting washer means comprise respective layers of metal and Teflon.

3. The improvement of claim 1 wherein said washer layers of said compound force transmitting washer comprise layers of Teflon and metallized Teflon.

4. The improvement of claim 3 wherein said metallized Teflon comprises molybdenum-filled Teflon.

5. The improvement of claim 1 wherein said washer layers of said compound force transmitting washer means comprise layers of metal, Teflon, and molybdenum-filled Teflon.

6. The improvement of claim 1 wherein said washer layers are substantially disc-shaped.

7. The improvement of claim 1 wherein said compound force transmitting washer means comprise spherical washers.

8. The improvement of claim 1 wherein said compound force transmitting washer means comprise at least two stacked, flat washers.

9. The improvement of claim 1 wherein said washer layers are disposed in substantially laterally slipable array.

10. The improvement of claim 1 wherein said elongated collar means comprises top and lower collar elements.

11. The improvement of claim 10 wherein said top and lower collar elements are joined together by thread means respectively disposed on said top and on said lower collar elements.

12. The improvement of claim 11 wherein said one of said collar elements has interior threads disposed in the central bore thereof for joining with exteriorly disposed threads of said other collar element.

13. The improvement of claim 10 further comprising locking means for said collar elements.

14. The improvement of claim 13 wherein said locking means comprises at least one set screw disposed through one of said collar elements and engaging the other for preventing disassembly of said collar means elements.

15. The improvement of claim 14 wherein at least one said set screw is disposed through a lateral wall of said collar element and engages the exterior threads of said other collar element to securely hold said collar means together.

16. The improvement of claim 1 further comprising an annular shaped insert means disposed around the first shaft.

17. The improvement of claim 16 wherein said annular shaped insert means is fixedly secured to said first shaft by means of a set screw.

18. The improvement of claim 17 wherein said locking means comprises at least one set screw.

19. The improvement of claim 1 wherein said collar means is substantially elongated in shape.

20. The improvement of claim 1 wherein at least one of said washer layers of said compound force transmitting washer is selected from the group consisting of fiberglass-filled and graphite-filled Teflons.

21. The improvement of claim 1 wherein the force directed is a pushing force.

22. The improvement of claim 1 wherein the force directed is a pulling force.

23. The improvement of claim 1 further comprising force directing insert means fixedly secured to the first shaft for transmitting force from the first shaft to the compound force transmitting means.

24. The improvement of claim 23 wherein said force directing insert means comprises an annular-shaped disc.

25. The improvement of claim 24 wherein said annular-shaped disc is conncted to the first shaft by threads disposed within the central aperture of said annular-shaped disc.

26. The improvement of claim 25 further comprising a threaded tip attached to the first shaft for threaded engagement with the threaded central aperture of said annular-shaped disc.

27. The improvement of claim 1 wherein said compound force transmitting means are disposed on opposite top and bottom sides of said force directing insert means for receiving respectively pulling and pushing forces from the first shaft.

28. The improvement of claim 1 wherein the second shaft is fixedly secured to a lower portion of said collar means.

29. The improvement of claim 28 wheren the second shaft is disposed within said central bore and fixedly secured to said lower portion of said collar means by means of at least one set screw.

30. The improvement of claim 1 wherein the first shaft is disposed within said aperture of said collar means at the top longitudinal end thereof and such aperture is sufficiently larger in diameter than the diameter of the first shaft to permit a range of non-concentricity by the first shaft.

31. The improvement of claim 1 wherein the washer containing space of said collar means is of such lateral dimensions as to contain relatively snugly said compound force transmitting washer means disposed therewithin.

* * * * *